(12) United States Patent
Takebe et al.

(10) Patent No.: US 9,257,712 B2
(45) Date of Patent: Feb. 9, 2016

(54) FUEL CELL SYSTEM AND OPERATION METHOD THEREOF

(75) Inventors: Yasuo Takebe, Kyoto (JP); Kunihiro Ukai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 380 days.

(21) Appl. No.: 13/808,537

(22) PCT Filed: Jul. 4, 2011

(86) PCT No.: PCT/JP2011/003794
§ 371 (c)(1),
(2), (4) Date: Jan. 4, 2013

(87) PCT Pub. No.: WO2012/004963
PCT Pub. Date: Jan. 12, 2012

(65) Prior Publication Data
US 2013/0108937 A1    May 2, 2013

(30) Foreign Application Priority Data

Jul. 7, 2010    (JP) ................................. 2010-155244

(51) Int. Cl.
*H01M 8/06* (2006.01)
*C01B 3/38* (2006.01)
*H01M 8/04* (2006.01)

(52) U.S. Cl.
CPC .............. *H01M 8/0618* (2013.01); *C01B 3/384* (2013.01); *H01M 8/04097* (2013.01);
(Continued)

(58) Field of Classification Search
CPC ............ C01B 3/384; C01B 2203/0233; C01B 2203/044; C01B 2203/0445; C01B 2203/047; C01B 2203/066; C01B 2203/0811; C01B 2203/0827; C01B 2203/1235; C01B 2203/1258; C01B 2203/141; C01B 2203/148
USPC ......................................... 429/410, 415, 423
See application file for complete search history.

(56) References Cited

U.S. PATENT DOCUMENTS

| 5,302,470 | A | * | 4/1994 | Okada et al. ................... 429/410 |
| 2002/0182462 | A1 | | 12/2002 | Ballantine et al. |
| 2004/0124843 | A1 | * | 7/2004 | Hamada et al. ............... 324/434 |
| 2005/0115150 | A1 | | 6/2005 | Ukai et al. |
| 2006/0147771 | A1 | | 7/2006 | Russell et al. |
| 2008/0160367 | A1 | * | 7/2008 | Masui et al. ..................... 429/20 |

FOREIGN PATENT DOCUMENTS

| CN | 101580735 A | 11/2009 |
| JP | 61-232569 A | 10/1986 |

(Continued)

OTHER PUBLICATIONS

Notification of First Office Action dated Sep. 30, 2014 issued in corresponding Chinese Patent Application No. 201180033218.1 (English translation).

(Continued)

*Primary Examiner* — Basia Ridley
*Assistant Examiner* — Heng Chan
(74) *Attorney, Agent, or Firm* — McDermott Will & Emery LLP

(57) ABSTRACT

In a fuel cell system of the present invention, a reformed gas generated in a reformer (R1) being activated is supplied to a fuel cell stack (F1), and an off-gas discharged from the fuel cell stack (F1) is supplied to a heat supply device (B2) provided for a reformer (R2) being deactivated. By activating at least one reformer (Rn), all of a plurality of reformers (Rn) can be warmed-up. Therefore, energy consumption in a standby state can be suppressed, and the fuel cell system can be started-up quickly in emergencies. The reformed gas may be supplied to the heat supply device (B2) instead of the off-gas.

17 Claims, 10 Drawing Sheets

(52) U.S. Cl.
CPC ..... *H01M 8/04604* (2013.01); *H01M 8/04619* (2013.01); *H01M 8/04776* (2013.01); *H01M 8/04955* (2013.01); *H01M 8/0675* (2013.01); *C01B 2203/0233* (2013.01); *C01B 2203/044* (2013.01); *C01B 2203/047* (2013.01); *C01B 2203/0445* (2013.01); *C01B 2203/066* (2013.01); *C01B 2203/0811* (2013.01); *C01B 2203/0827* (2013.01); *C01B 2203/1235* (2013.01); *C01B 2203/1258* (2013.01); *C01B 2203/141* (2013.01); *C01B 2203/148* (2013.01); *Y02E 60/50* (2013.01)

(56) References Cited

FOREIGN PATENT DOCUMENTS

| | | |
|---|---|---|
| JP | 02-060061 A | 2/1990 |
| JP | 04-123766 A | 4/1992 |
| JP | 2000-333386 A | 11/2000 |
| JP | 2002-075388 A | 3/2002 |
| JP | 2002-097001 A | 4/2002 |
| JP | 2002-367650 A | 12/2002 |
| JP | 2003-335503 A | 11/2003 |
| JP | 2004-006281 A | 1/2004 |
| JP | 2006-004700 A | 1/2006 |
| JP | 2006-248811 A | 9/2006 |
| JP | 2006-274624 A | 10/2006 |
| JP | 2007-161553 A | 6/2007 |
| JP | 2008-066096 A | 3/2008 |

OTHER PUBLICATIONS

International Search Report mailed Oct. 11, 2011 issued in corresponding International Application No. PCT/JP2011/003794.
Partial Supplementary European Search Report dated Jun. 18, 2015 issued in corresponding European Patent Application No. 11803303.4.

* cited by examiner

FUEL CELL SYSTEM AND OPERATION METHOD THEREOF

RELATED APPLICATIONS

This application is the U.S. National Phase under 35 U.S.C. §371 of International Application No. PCT/JP2011/003794, filed on Jul. 4, 2011, which in turn claims the benefit of Japanese Application No. 2010-155244, filed on Jul. 7, 2010, the disclosures of which Applications are incorporated by reference herein.

TECHNICAL FIELD

The present invention relates to a highly reliable fuel cell system which is suitably employed in a backup power supply or the like in a communication base station, etc., and an operation method thereof.

BACKGROUND ART

Conventionally, backup power supplies are provided to address an electric power failure (blackout) in emergencies such as disasters in communication base stations, communication equipment such as data centers, hospitals, broadcast stations, etc. Among the backup power supplies, as a backup power supply using the fuel cell, there is known a configuration in which a fuel cell generates electric power using hydrogen stored in a hydrogen tank (see Patent Literature 1). The backup power supply having this configuration has an advantage that the fuel cell can be started-up (activated) quickly. However, when all of hydrogen inside of the hydrogen tank has been consumed, the hydrogen tank must be replaced. A work for replacing the hydrogen tank is burdensome and cost of the replacement of the hydrogen tank is needed. If catastrophe such as an earthquake, a typhoon, or a hurricane happens, a traffic network such as a road is cut, and the hydrogen tank will not be supplied. In this case, there is a possibility that the backup power supply does not work in the disasters in which backup power supplies are especially needed.

By comparison, there is a known a configuration in which the hydrogen tank is not used as the power supply using the fuel cell. As a typical fuel cell of this, there is a power supply which uses a fuel of a hydrocarbon based gas supplied by a gas utility (infrastructure of gas supply) according to a demand. In this fuel cell, typically, a reformer reforms the fuel of the hydrocarbon based gas to generate a reformed gas containing hydrogen as a major component, and the reformed gas is supplied to a fuel cell stack, which generates electric power (e.g., see Patent Literature 2).

An example of the fuel cell system having the above configuration will be specifically described. As shown in FIG. 10, in a fuel cell system 110, a fuel is supplied from a raw material supply line 101 to a reformer R0 via a desulfurization device D0 and a raw material supply device Bt by opening a raw material shut-off valve Va0. The reformer R0 reforms the fuel into a reformed gas containing hydrogen as a major component, and the reformed gas is supplied to a fuel cell stack F0 via a reformed gas supply line 102. After passing through the fuel cell stack F0, the reformed gas (off-gas) is supplied to a heat supply device B0 via an off-gas line 103 and a combustion gas valve Vb0. The heat supply device B0 combusts the off-gas to warm-up the reformer R0.

An oxidizing gas supply device S0 supplies air to the fuel cell stack F0 via an oxidizing gas supply line 104. The fuel cell stack F0 carries out power generation by causing the reformed gas and the air to be reacted with each other. Reference numeral 105 designates a reformed gas reuse line 105 for supplying hydrogen to the desulfurization device D0 including a hydrogenated desulfurization device. Reference symbol Vc0 designates a reformed gas reuse valve Vc0.

CITATION LISTS

Patent Literature

Patent Literature 1: Japanese Laid-Open Patent Application Publication No. 2000-333386
Patent Literature 2: Japanese Laid-Open Patent Application Publication No. 2002-097001

SUMMARY OF THE INVENTION

Technical Problem

However, in a case where the fuel cell system including the reformer is used as a backup power supply, the following problems arise.

Specifically, the backup power supply is deactivated and does not generate electric power in a normal state, and is started-up (activated) to generate electric power when an electric power failure (blackout) happens (in emergencies). Therefore, the backup power supply is required to be surely able to generate electric power in emergencies. In particular, backup power supplies installed in a communication base station or in a medical device in a hospital are required to generate electric power urgently and surely in the emergencies. Therefore, these backup power supplies are started-up (activated) in a simulated manner on a regular basis to check whether or not they are able to generate electric power normally (power generation check). The frequency with which the power generation check is performed is typically once per day although it depends on a reliability of a fuel cell system, equipment (facility) supplied with the electric power, and allowability of an electric power failure in the device, etc.

When the fuel cell system is started-up, it is necessary to warm-up the reformer. Therefore, a great amount of energy is consumed to start-up the fuel cell. To enable a reforming reaction to proceed well, it is necessary to heat the reformer up to about 700 degrees C. For example, in a case where a power generation ability of the fuel cell system is 5 kW, a fuel of about 15 kW is consumed to start-up the fuel cell system. Therefore, the fuel cell system placed in a standby state against emergencies, in which the fuel cell system does not generate electric power, requires a great amount of energy to warm-up the reformer. If the power generation check which requires simulated start-up is performed frequently, a greater amount of energy is consumed.

If the fuel cell system includes a CO removing device or the like in addition to the reformer, an energy is required to warm-up the CO removing device or the like. In this case, an amount of energy used in the standby state against the electric power failure or the power generation check increases. If a deactivated reformer is in a room air condition, then a start-up time which is about 1 hour is required as a time for which the reformer is heated up to about 700 degrees C. to warm up the reformer, a time for which the CO removing device is warmed up, etc. Under the circumstances in which the start-up time is long, the backup power supply is unable to generate electric power urgently in the case of the electric power failure. Thus, it is difficult to implement backup of the electric power quickly and surely in the emergencies.

The present invention has been developed to solve the problem associated with the prior art, and an object of the present invention is to provide a fuel cell system including a reformer, which can suppress consumption of energy in a standby state against emergencies and can be started-up quickly, and an operation method thereof.

Solution to Problem

To solve the above described problem, a fuel cell system of the present invention comprises a plurality of reformers for reforming a raw material to generate a reformed gas containing hydrogen; at least one fuel cell stack for generating electric power using the reformed gas supplied from the reformers; heat supply devices provided as corresponding to the reformers, respectively, each of the heat supply devices being configured to combust the reformed gas to supply heat to corresponding one of the reformers; and a reformed gas mutual use line through which the reformed gas generated in each of the reformers is supplied to the heat supply device corresponding to another one of the reformers.

In the fuel cell system, the reformed gas mutual use line may be an off-gas mutual use line through which a portion of an off-gas is supplied to the heat supply device corresponding to another one of the reformers, the off-gas being the reformed gas supplied from each of the reformers to the fuel cell stack and discharged from the fuel cell stack.

In the fuel cell system, the fuel cell stack may include a plurality of fuel cell stacks corresponding to the plurality of reformers, respectively, and the fuel cell system may further comprise: a reformed gas supply line connecting the plurality of reformers to the plurality of fuel cell stacks, respectively, in one-to-one correspondence.

The fuel cell system may further comprise: a reformed gas supply line connecting the plurality of reformers to the fuel cell stack to cause reformed gases generated in the plurality of reformers to be joined and supplied to the fuel cell stack.

The fuel cell system may further comprise a desulfurization device which removes a sulfur component from the raw material through a hydrogenated desulfurization reaction and supplies to the reformer, the raw material from which the sulfur component has been removed; and a reformed gas reuse line which returns a portion of the reformed gas generated in the reformer to the desulfurization device.

In the fuel cell system, the desulfurization device may include a plurality of desulfurization devices corresponding to the plurality of reformers, respectively.

The fuel cell system may further comprise a combustion gas supply line through which the reformed gas generated in each of the reformers is supplied to the heat supply device corresponding to the reformer.

In the fuel cell system, the reformed gas mutual use line may be configured to supply a portion of the reformed gas generated in each of the reformers and supplied to the fuel cell stack, to the heat supply device corresponding to another one of the reformers, via the another one of the reformers and the combustion gas supply line.

The fuel cell system may further comprise: a controller; wherein the controller may perform control in such a manner that when at least one of the reformers is activated with another reformers being deactivated, and at least one of the another reformers being deactivated should start to be activated, the reformed gas generated in the reformer being activated is supplied through the reformed gas mutual use line to the heat supply device corresponding to the reformer which should start to be activated to warm-up the reformer which should start to be activated by using the heat supply device, and then the reformer which should start to be activated is activated and the reformer being activated is deactivated.

The fuel cell system may further comprise: a power generation inspector for inspecting a power generation state of the fuel cell stack; wherein the controller may perform control in such a manner that the fuel cell stack supplied with the reformed gas from the reformer being activated starts power generation, the power generation inspector inspects a power generation state of the power generation performed in the fuel cell stack, and the power generation in the fuel cell stack is stopped after the inspection.

In the fuel cell system, the fuel cell stack may include a plurality of fuel cell stacks; and wherein the controller may perform control in such a manner that after inspection for the power generation state of one of the fuel cell stacks is completed and power generation in the one of the fuel cell stacks is stopped, power generation in another fuel cell stack is started, and the power generation inspector inspects a power generation state of the power generation performed in the another fuel cell stack.

To solve the above described problem, according to the present invention, there is provided a method of operating a fuel cell system including a plurality of reformers for reforming a raw material to generate a reformed gas containing hydrogen; and at least one fuel cell stack for generating electric power using the reformed gas supplied from the reformers; the method comprising: in a state in which the fuel cell system is in a standby state against emergencies, activating at least one of the reformers and deactivating another reformers; and when at least one of the reformers being deactivated starts to be activated, deactivating the reformer being activated.

In the method of operating the fuel cell system, the fuel cell system may further include heat supply devices provided as corresponding to the reformers, respectively, each of the heat supply devices being configured to combust the reformed gas to supply heat to corresponding one of the reformers; and a reformed gas mutual use line through which the reformed gas generated in each of the reformers is supplied to the heat supply device corresponding to another one of the reformers; the method comprising: in a state in which the fuel cell system is in a standby state against emergencies, supplying the reformed gas generated in the reformer being activated to the heat supply device corresponding to the reformer being deactivated via the reformed gas mutual use line to warm-up the reformer being deactivated by using the heat supply device.

The method of operating the fuel cell system, may comprise: in a state in which the fuel cell system is in a standby state against emergencies, causing the fuel cell stack supplied with the reformed gas from the reformer being activated to start power generation; inspecting a power generation state of the power generation performed in the fuel cell stack; and causing the fuel cell stack to stop the power generation after the inspection.

In the method of operating the fuel cell system, the fuel cell system may include a plurality of fuel cell stacks, and the method may comprise: in a state in which the fuel cell system is in a standby state against emergencies, inspecting a power generation state of one of the fuel cell stacks and stopping power generation in the one of the fuel cell stacks after the inspection is completed; causing another fuel cell stack to start power generation; and inspecting a power generation state of the power generation performed in the another fuel cell stack.

In the fuel cell system, the fuel cell system may include a plurality of power generation units each of which is configured such that one reformer supplies the reformed gas to one fuel cell stack, and the method further comprise in a state in which the fuel cell system is in a standby state against emergencies, inspecting power generation states of the power generation units sequentially one by one.

The method of operating the fuel cell system may comprise in a state in which the fuel cell system is in a standby state against emergencies, detecting whether or not electric power supply from a power supply system to electric power consumption equipment supplied with electric power from the fuel cell system and the power supply system is stopped; maintaining the standby state in the fuel cell system in a state in which a flow rate of the raw material supplied to the reformer being activated is reduced to be smaller than a flow rate of the raw material in a normally activated state of the reformer, when stop of the electric power supply is not detected; and increasing the flow rate of the raw material supplied to the reformer being activated to the flow rate of the raw material in the normally activated state of the reformer, and starting activation of the reformer being deactivated to shift the fuel cell system from the standby state to a power generation state, when the stop of the electric power supply is detected.

The method of operating the fuel cell system may comprise in a state in which the fuel cell system is in a standby state against emergencies, changing a ratio of the reformer being activated to the reformer being deactivated, among the plurality of reformers, depending on a time period.

The above and further objects, features and advantages of the present invention will more fully be apparent from the following detailed description of preferred embodiments with accompanying drawings.

Advantageous Effects of the Invention

As described above, in the present invention, in a fuel cell system including a reformer and an operation method thereof, energy consumption in a standby state against emergencies can be suppressed and the fuel cell system can be started-up quickly in the emergencies.

DESCRIPTION OF THE EMBODIMENTS

Figure 1:
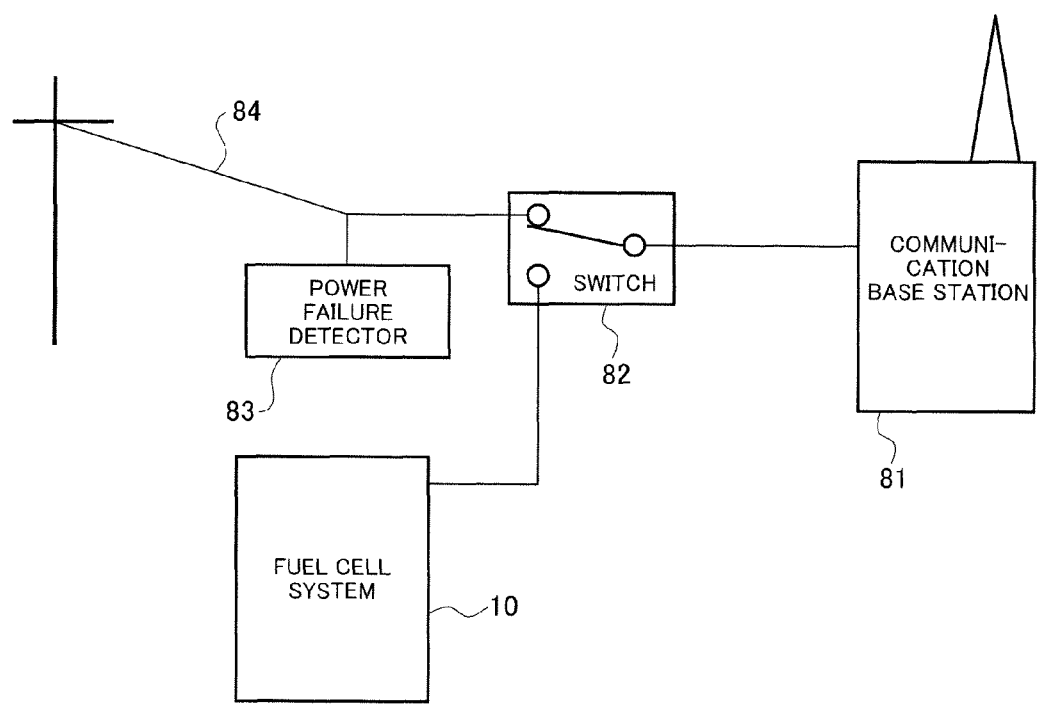
FIG. 1 is a block diagram schematically showing a configuration in a case where a fuel cell system according to Embodiment 1 of the present invention is used as a backup power supply in a communication base station.

Hereinafter, preferred embodiments of the present invention will be described with reference to the drawings. Throughout the drawings, the same or corresponding components are designated by the same reference numerals and will not be described in detail.

Embodiment 1

Figure 2:
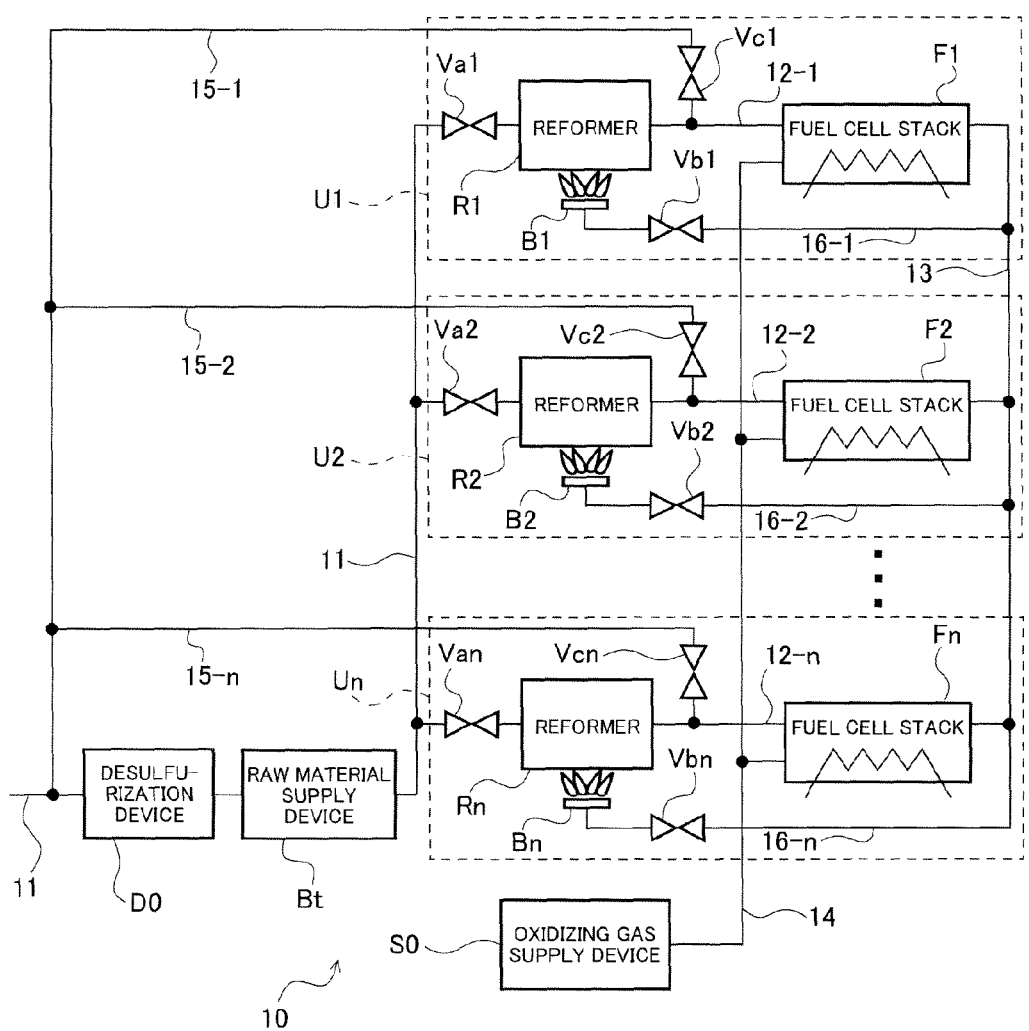
FIG. 2 is a block diagram schematically showing an exemplary configuration of major components in the fuel cell system of FIG. 1.

As shown in FIG. 2, a fuel cell system 10 according to Embodiment 1 of the present invention is installed as, for example, a backup power supply for a communication base station 81. The communication base station 81 is switchably connected to a utility power net 84 or to the fuel cell system 10 via a power supply switch 82. Normally, the power supply switch 82 is placed in a state to allow electric power to be supplied from the utility power net 84 to the communication base station 81. When an power failure detector 83 provided between the power supply switch 82 and the utility power net 84 detects an electric power failure, the communication base station 81 is connected to the fuel cell system 10 instead of the utility power net 84. Hereinafter, the communication base station will be referred to as "outside load." As the "outside load," a simulated load such as a resistor element is built into the fuel cell system 10, and a power output controller (described later) may be switchably connected to the simulated load or to the power supply switch 82.

A target (outside load) for which the fuel cell system 10 is used as a backup power supply is not limited to the communication base station 81, so long the target is electric power consumption equipment which is supplied with the electric power from a power supply system (utility power net, etc.) other than the fuel cell system 10 and requires normal management even in emergencies in which electric power supply from the power supply system stops. Specifically, as the target, for example, there are a communication base station, communication equipment such as a data center, a hospital, a broadcast station, etc. The fuel cell system 10 can be used as a backup electric power supply by itself and is also applicable to a cogeneration system. Moreover, another power supply system is not limited to the utility power net, but may be a home power generation apparatus or the like which is always activated.

[Configuration of Fuel Cell System]

As shown in a configuration of major components in FIG. 2, the fuel cell system 10 according to the present embodiment includes a desulfurization device D0, a raw material supply device Bt, an oxidizing gas supply device S0, a plurality of reformers R1~Rn, a plurality of fuel cell stacks F1~Fn, a plurality of heat supply devices B1~Bn, lines coupling them to each other, and valves provided in these lines. It is sufficient that the fuel cell system 10 includes the plurality of reformers R1~Rn, the plurality of fuel cell stacks F1~Fn, and the plurality of heat supply devices B1~Bn.

Reference symbols of these components will be described. Regarding the reformers R1~Rn, "R1" indicates "first" reformer, and "Rn" indicates "n-th reformer." Therefore, "reformers R1~Rn" are "n" reformers. In FIG. 2, since three reformers, three fuel cell stacks and three heat supply devices are provided, n=3. Hereinafter, in a case where any one of the "n" reformers is described, this will be expressed as n-th "reformer Rn". Hereinafter, an upstream side or a downstream side in a flow direction of the raw material or the gas will be simply referred to as "upstream" or "downstream."

The desulfurization device D0 is coupled to the raw material supply line 11, and removes a sulfur component from the raw material. The desulfurized raw material is supplied to the raw material supply device Bt. The raw material supply device Bt supplies a raw material to the reformers R1~Rn via the raw material supply line 11 and the raw material shut-off valves Va1~Van. In this case, the raw material supply device Bt supplies the raw material while adjusting supply of the raw material. The raw material supply line 11 is connected to a raw material gas source ((e.g., infrastructure of a city gas or liquefied petroleum gas (LPG)), and is supplied with a hydrocarbon-based gas (e.g., natural gas) according to a demand. The raw material supply line 11 branches to be connected to the reformers R1~Rn, and the raw material shut-off valves Va1~Van provided downstream (upstream of the reformers R1~Rn) of the points at which the raw material supply line 11 branches.

The reformers R1~Rn reform the desulfurized raw material to generate the reformed gas which is a hydrogen-containing gas and supply the reformed gas to the fuel cell stacks F1~Fn via reformed gas supply lines 12-1~12-n, respectively. The reformed gas supply line 12-n connects the reformer Rn to the fuel cell stack Fn in a one-to-one correspondence. Reformed gas reuse lines 15-1~15-n branch from the reformed gas supply lines 12-1~12-n, respectively, and are connected to the raw material supply line 11 upstream of the desulfurization device D0. A reformed gas reuse valve Vcn is provided upstream of the reformed gas reuse line 15-n. The reformed gas reuse valve Vcn is opened and closed to permit and inhibit a flow of a portion of the reformed gas to the raw material supply line 11.

An oxidizing gas supply device S0 is connected to the fuel cell stack Fn via an oxidizing gas supply line 14. The oxidizing gas supply device S0 supplies an oxidizing gas (e.g., air) to the fuel cell stack Fn. The fuel cell stack Fn performs power generation using the reformed gas and the oxidizing gas. The reformed gas, i.e., off-gas which has not been consumed in the power generation is discharged as a combustion gas from the fuel cell stack Fn to the combustion gas supply line 16-n. Therefore, this combustion gas, i.e., off-gas is the reformed gas. The combustion gas supply line 16-n is connected to the heat supply device Bn via the combustion gas valve Vbn. One heat supply device Bn is provided as corresponding to one reformer Rn. The heat supply device Bn combusts a combustion gas and supplies to the reformer Rn heat required for a steam reforming reaction.

Combustion gas supply lines 16-1~16-n are connected together via an off-gas mutual use line 13. Combustion gas valves Vbn provided in the combustion gas supply lines 16-1~16-n, respectively, are properly opened and closed to selectively supply the combustion gas (reformed gas from the corresponding rammer Rn) from the corresponding fuel cell stack Fn or the combustion gas (reformed gas from another reformer Rn) from another fuel cell stack Fn, to a particular heat supply device Bn.

Specific configurations of the desulfurization device D0, the raw material supply device Bt, the oxidizing gas supply device S0, the reformer Rn, the fuel cell stack Fn, the heat supply device Bn, the lines and the valves are not particularly limited. For example, the desulfurization device D0 is configured to remove a sulfur component by a hydrogenated desulfurization reaction. In this configuration, as hydrogen added to a hydrocarbon-based gas for desulfurization, the reformed gas generated in the reformer Rn is used. As shown in FIG. 2, the reformed gas reuse line 15-n connects a downstream side of the reformer Rn to an upstream side of the desulfurization device D0. Therefore, the reformed gas generated in the reformer Rn is returned to and re-used in the desulfurization device D0. The desulfurization device D0 may be configured to include an adsorbing agent for adsorbing a sulfur component. In this case, the reformed gas reuse line 15-n is unnecessary.

As the raw material supply device Bt, for example, a known raw material supply pump is used. As the oxidizing gas supply device S0, for example, a known blower is used. It is sufficient that the fuel cell stack Fn is supplied with the reformed gas and the oxidizing gas. The oxidizing gas is not limited to the air, but pure oxygen may be used.

As the reformer Rn, for example, a steam reformer may be used. In this case, a raw material formed by adding the steam to the hydrocarbon-based gas may be supplied to the reformer Rn. A CO removing device may be provided downstream of the reformer Rn, although not shown. The CO removing device is used to reduce a carbon nonoxide (CO) concentration in the reformed gas generated in the reformer Rn. As the CO removing device, a known reactor such as a shift converter, a selective oxidizer, or a methanation device is used.

As the fuel cell stack Fn, a plurality of power generation cells are stacked together. A specific configuration of each power generation cell is not particularly limited, and may be a polymer electrolyte fuel cell, a solid oxide fuel cell, a phosphoric-acid fuel cell, a molten carbonate fuel cell, etc. "Power generation fuel" supplied to the fuel cell stack Fn is, as described above, the reformed gas. The raw material supplied to generate the reformed gas is not limited to the hydrocarbon-based gas such as a natural gas. For example, the raw material may be another hydrocarbon-based gas such as a propane gas. Or, a hydrocarbon-based fuel in a liquid form in a room temperature such as kerosene may be supplied. Or, an organic fuel other than hydrocarbon, such as methanol, may be used.

The heat supply device Bn combusts the off-gas to heat the reformer Rn. In other words, the heat supply device Bn is a heat supply device for keeping a temperature of the reformer Rn within a desired range. If the reformer Rn is the steam reformer, the steam reforming reaction is an endothermic reaction, and therefore, heating from outside is required to promote the reaction. Therefore, for the reformer Rn, a known heat supply device for generating heat using the off-gas or the reformed gas as a fuel may be used, not limited to the heat supply device Bn. A preferable temperature for the steam reforming reaction in the reformer Rn is typically about 700 degrees C. The heat supply device Bn may have fire power for implementing this temperature.

In the present embodiment, the heat supply device Bn is disposed in the vicinity of the reformer Rn. In other words, the fuel cell system 10 of the present embodiment, the heat supply device Bn is configured to heat the reformer Rn from outside of the reformer Rn.

As the raw material supply line 11, the reformed gas supply line 12-n, the off-gas mutual use line 13, the oxidizing gas supply line 14, the reformed gas reuse line 15-n, and the combustion gas supply line 16-n, known pipes are used, but known passages other than the pipes may be used. As the raw material shut-off valve Van, the combustion gas valve Vbn, and the reformed gas reuse valve Vcn, known on-off valves are used.

The fuel cell stack Fn is provided with water flow passages. In FIG. 2, a specific configuration of the water flow passages is not shown. As the water flow passages, there are a reforming water supply passage, a cooling water circulating passage, a recovered water circulating passage, a hot water circulating passage, etc., but they are exemplary. The fuel cell system 10 may be configured not to include the desulfurization device D0, the raw material supply device Bt, and the like. For example, if the raw material (typically, hydrocarbon based gas) contains no sulfur component, the desulfurization device D0 is unnecessary. If a sufficient pressure of the raw material is ensured, a pressure increasing function in the raw material supply device Bt is unnecessary (but a flow control function is necessary).

Figure 3:
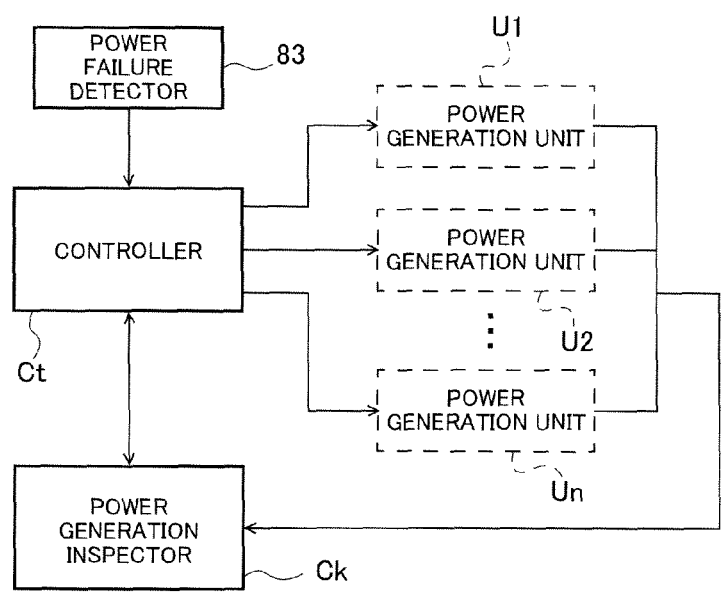
FIG. 3 is a block diagram showing an exemplary configuration of a control system for operating the fuel cell system of FIG. 2.

As shown in FIG. 2, the reformer Rn and the fuel cell stack Fn are connected to each other in a one-to-one correspondence via the reformed gas supply line 12-$n$. A set of one reformer Rn and one fuel cell stack Fn constitute a power generation unit Un so that one reformer Rn supplies the reformed gas to one fuel cell stack Fn. The fuel cell system 10 includes a plurality of power generation units U1~Un. As shown in FIG. 3, the plurality of power generation units U1~Un are controlled by a controller Ct. The controller Ct may control an operation of the overall fuel cell system 10 including plurality of power generation units U1~U3.

Specifically, the fuel cell system 10 includes a power output controller (not shown) for outputting to the outside load the electric power generated in the power generation units U1~Un. The power output controller is constituted by an inverter or the like. Electric output terminals of the power generation units U1~Un are connected in parallel to this power output controller. The controller Ct causes the power output controller to control the power output to the outside load and causes the raw material supply device Bt to control a supply amount of the raw material, thereby controlling a power generation operation of the power generation units U1~Un, i.e., running of the reformers Rn and the fuel cell stacks Fn. The controller Ct controls ON/OFF of the raw material shut-off valve Van, the combustion gas valve Vbn, and the reformed gas reuse valve Vcn in the power generation unit Un. A power generation inspector Ck inspects whether or not the fuel cell stack Fn (not shown in FIG. 3) included in the power generation unit Un is able to perform power generation normally.

The power generation check is performed in such a manner that a voltage detector (not shown) detects a power generation voltage in the fuel cell stack Fn and compares the detected voltage to a predetermined reference voltage. The power generation check performed by the power generation inspector Ck is performed by control by the controller Ct. The power generation inspector Ck inputs a result of the power generation check to the controller Ct. This input is used for the control of the power generation unit Un (and fuel cell system 10).

If the controller Ct receives as an input a detection signal of the electric power failure from the power failure detector 83, the controller Ct causes the fuel cell system 10 to shift from "standby state against emergencies such as the electric power failure" (hereinafter abbreviated as "standby state") to "power generation state." As will be described later, the controller Ct enables control in which in the standby state, the power generation units U1~Un are activated sequentially in a simulated manner, to perform the power generation check.

Specific configurations of the power supply switch 82, the power failure detector 83, the controller Ct, and the power generation inspector Ck are not limited, but known configurations are suitably used.

[Operation Method of Fuel Cell System]

The fuel cell system 10 configured as described above is normally placed in "standby state" but shifts to "power generation state" in emergencies. In the standby state, the plurality of power generation units U1~Un are activated sequentially one by one in a simulated manner, to perform the power generation check. This power generation check is performed in conjunction with the warm-up operation of the reformers R1~Rn. This warm-up operation is performed to start-up the power generation units U1~Un immediately when the electric power failure occurs. Exemplary operation control in the standby state will be specifically described with reference to FIG. 4. In the example shown in FIG. 4, it is supposed that three power generation units Un are provided and the power generation unit U1 is subjected to the power generation check.

In an initial state of the fuel cell system 10, all valves which are the raw material shut-off valves Va1~Va3, the combustion gas valves Vb1~Vb3, and the reformed gas reuse valves Vc1~Vc3, are closed.

Initially, the controller Ct opens the raw material shut-off valve Va1 (step S101), and then opens the combustion gas valve Vb1 (step S102). The raw material shut-off valve Va1 and the combustion gas valve Vb1 may be opened in a reversed order or at the same time. Thereby, the reformed gas discharged from the fuel cell stack Fn in a deactivated state is supplied to the heat supply device B1. Thereafter, the controller Ct causes the heat supply device B1 to be ignited (step S103). Thereupon, the reformer R1 starts to be activated. Although a step is not shown in FIG. 4, the controller Ct opens the reformed gas reuse valve Vc1 and returns a portion of the reformed gas to an upstream side of the desulfurization device D0 after the reformer R1 starts to be activated. In the desulfurization device D0, a hydrogenated desulfurization reaction is promoted and desulfurization is performed efficiently.

The reformed gas generated in the reformer R1 being activated is supplied to the fuel cell stack F1. The controller Ct causes the oxidizing gas supply device S0 to be activated and the power output controller to take out a current and to supply the current to the outside load. Thereby, the power generation in the fuel cell stack F1 is initiated (step S104). In a case where the power generation check is not performed, the current may not be taken out of the fuel cell stack F1 and thereby the power generation may not be started. During the power generation, the hydrogen contained in the reformed gas is consumed while the reformed gas is passing through the fuel cell stack F1. The off-gas flowing out of the fuel cell stack F1 contains the hydrogen which has not been consumed. The off-gas is supplied as the combustion gas to the heat supply device B1 via the combustion gas supply line 16-1. The heat supply device B1 combusts the off-gas to maintain a temperature of the reformer R1.

Then, the controller Ct causes the power generation inspector Ck to perform the power generation check about the fuel cell stack F1 generating the electric power (step S105). If an abnormality in the power generation state of the fuel cell stack F1 is detected (NG in step S105), the controller Ct causes the fuel cell system 10 to be shut down, and issues an error signal (step S106). On the other hand, if the fuel cell stack F1 is performing the power generation normally (OK in step S105), the controller Ct causes the power output controller to shut off a current in the fuel cell stack F1 and stops the power generation (step S107), opens the combustion gas valve Vb2 in the power generation unit U2 (step S108), ignites the heat supply device B2 (step S109), and starts the warm-up of the reformer R2 in the power generation unit U2. Further, the controller Ct opens the combustion gas valve Vb3 in the power generation unit U3 (step S110), and ignites the heat supply device B3 (step S111), thereby starting the warm-up of the reformer R3 in the power generation unit U3. In this way, in the standby state, the three reformers R1~R3 can be warmed up. Therefore, the fuel cell system 10 can be placed in the standby state against the electric power failure.

Thereafter, the power failure detector 83 detects the electric power failure (step S112). If the power failure detector 83 does not detect the electric power failure (NO in step S112), warm-up of the reformers R2 and R3 is continued (return to step S108). If the power failure detector 83 detects the electric power failure (YES in step S112), the fuel cell system 10 shifts from the standby state to the power generation state. The controller Ct opens the raw material shut-off valve Va2 in the power generation unit U2 (step S113), opens the raw material shut-off valve Va3 in the power generation unit U3 (step S114), causes the power output controller to take out a current and supply the current to the outside load, thereby causing all of the fuel cell stacks F1~F3 to start power generation (step S115). As described above, all of the reformers R1~R3 have been warmed-up. Under the circumstance, if an electric power failure occurs and it becomes necessary to quickly perform power generation in the fuel cell system 10, all of the power generation units U1~U3 can start the power generation immediately upon reception of the raw material.

Thereafter, the controller Ct controls the power generation state, and hence terminates the control in the standby state. The control for the power generation units U2 and U3 is performed in the same manner. The control may be performed as follows. After the power generation check for the first power generation unit U1 is completed and the power generation in the first power generation unit U1 stops, the power generation check for the second power generation unit U2 is performed. After the power generation check for the second power generation unit U2 is completed, the power generation check for the third power generation unit U3 is performed.

As described above, in the standby state of the fuel cell system 10, at least one of the plurality of reformers Rn is activated and the remaining reformers are warmed-up. In this situation, each of the plurality of fuel cell stacks Fn is able to start the power generation quickly and be subjected to the power generation check. Therefore, a portion of the energy consumed in the reformer Rn in the standby state can be utilized in the power generation check.

Energy balance among the power generation units U1~U3 in the above stated operation control is shown in the following table 1. In the example shown in table 1, burners are used as the heat supply devices B1~B3.

TABLE 1

| | Energy balance (unit: W) | | | | | | |
|---|---|---|---|---|---|---|---|
| State | Fuel supplied to reformer | | Reformed gas from reformer | | Consumption in fuel cell stack | | Off-gas to heat supply device |
| I | R1 | 1,200 | R1 | 1,000 | F1 | 666 | B1 | 333 |
| | R2 | 0 | R2 | 0 | F2 | 0 | B2 | 0 |
| | R3 | 0 | R3 | 0 | F3 | 0 | B3 | 0 |
| II | R1 | 1,200 | R1 | 1,000 | F1 | 0 | B1 | 333 |
| | R2 | 0 | R2 | 0 | F2 | 0 | B2 | 333 |
| | R3 | 0 | R3 | 0 | F3 | 0 | B3 | 333 |
| III | R1 | 1,200 | R1 | 1,000 | F1 | 666 | B1 | 333 |
| | R2 | 1,200 | R2 | 1,000 | F2 | 666 | B2 | 333 |
| | R3 | 1,200 | R3 | 1,000 | F3 | 666 | B3 | 333 |

Figure 4:
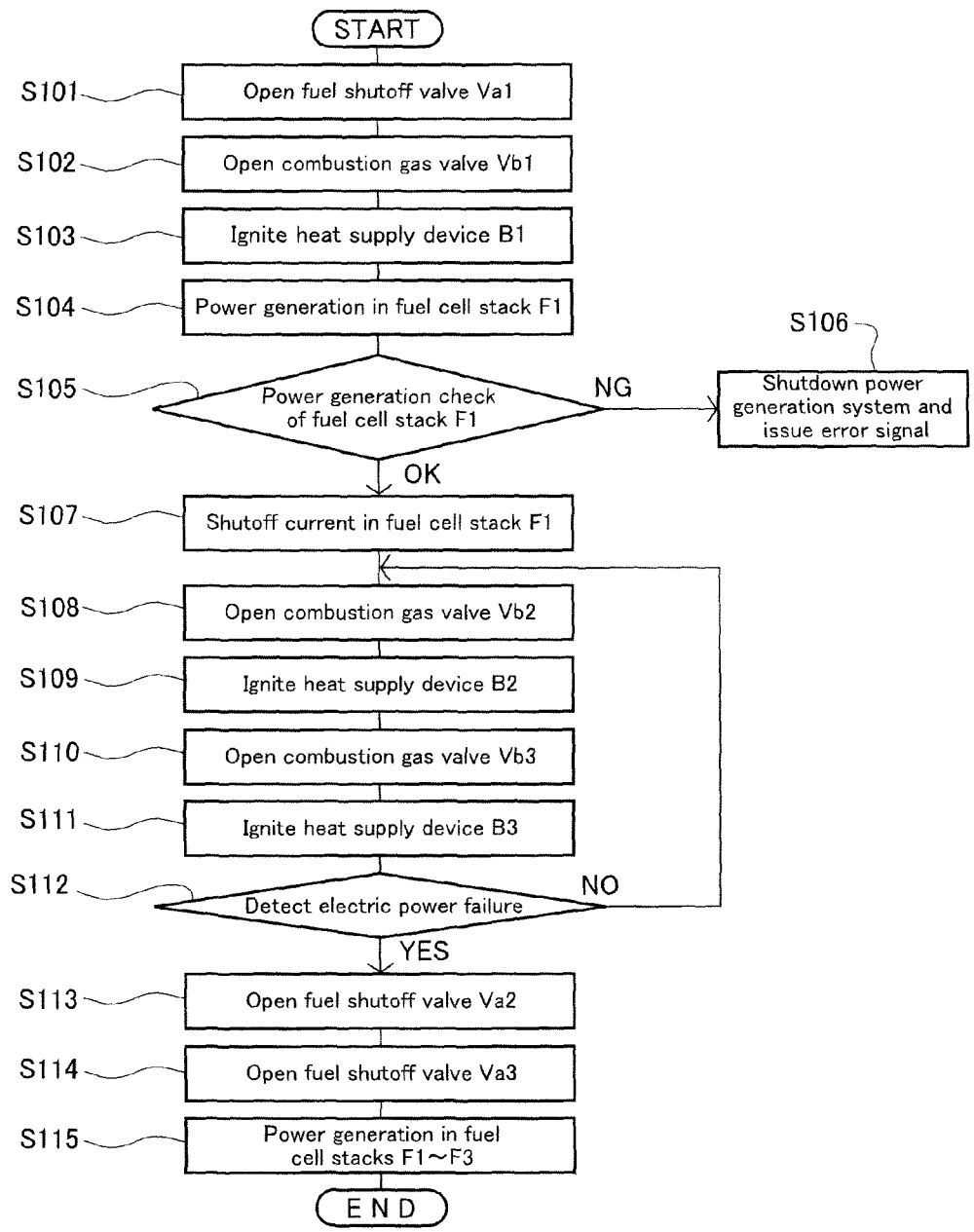
FIG. 4 is a flowchart showing exemplary operation control in the fuel cell system of FIG. 2.

In the table, State I indicates a state in which only the power generation unit U1 is performing the power generation in the standby state, corresponding to step S104 in FIG. 4. In State I, a fuel having an energy of 1.2 kW is supplied to the reformer R1, which reforms the fuel into a reformed gas having an energy of 1 kW. In this reformed gas, hydrogen which is equivalent to 2/3 (666 W) of the overall energy is consumed by the power generation to generate an off-gas which is equivalent to 1/3 (333 W) of the overall energy. A portion of the off-gas is supplied to the heat supply device B1 and combusted therein, thereby maintaining a temperature of the reformer R1 well.

State II indicates a state in which the power generation in the fuel cell stack F1 is stopped, in the standby state, corresponding to step S108~step S111 in FIG. 4. In State II, no energy is consumed in the fuel cell stack F1, and therefore the off-gas has an energy of 1 kW which is equal to that of the reformed gas. If this off-gas is supplied to the heat supply device B1 without modifying it, a combustion heat amount becomes excess, which causes a possibility that a temperature of the reformer R1 increases excessively. To solve this, the combustion gas valves Vb2 and Vb3 are opened to supply the off-gas to the heat supply devices B2 and B3 of the power generation units U2 and U3. Thereby, each of the heat supply devices B1~B3 combusts 1/3 (333 W) of the overall energy of the off-gas, to warm-up each of the reformers R1~R3. Therefore, the temperature of each of the three reformers R1~R3 is maintained well.

State III indicates a power generation state rather than the standby state and corresponds to step S115 in FIG. 4. In this state, in all of the power generation units U1~U3, the fuel cell stacks F1~F3 perform the power generation and consume 2/3 of the overall energy of the reformed gas. In each of the power generation units U1~U3, the off-gas has 1/3 of the energy. Because of this, the temperature of each of the reformers R1~R3 in the power generation units U1~U3, is maintained well.

Figure 10:
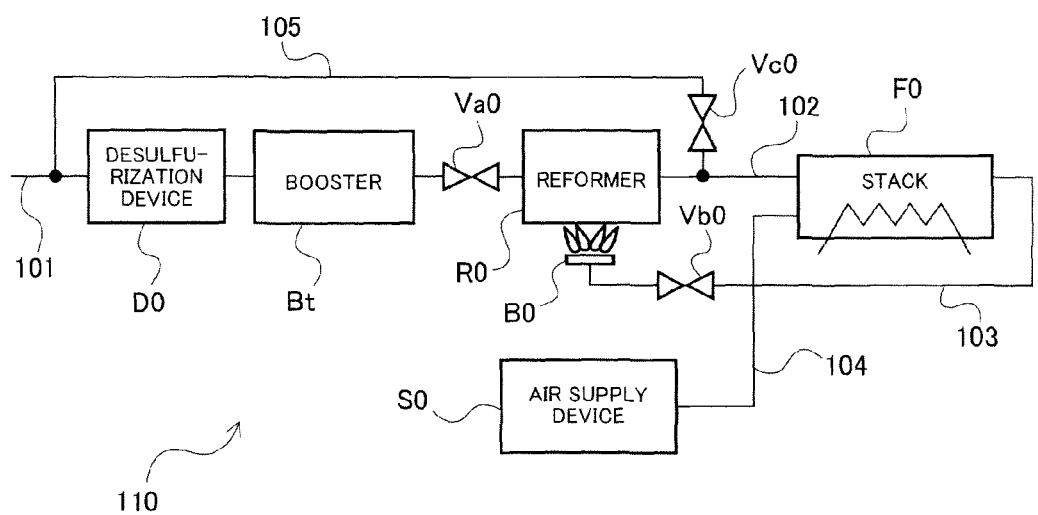
FIG. 10 is a block diagram schematically showing an exemplary configuration of a conventional fuel cell system.

In the fuel cell system 10 having the configuration of FIG. 2, as indicated by State I or State II, the energy of the raw material supplied is 1.2 kW. In a system in which three conventional configurations (see FIG. 10) are arranged in parallel, an energy of 3.6 kW which is equal to that of state III shown in table 1 becomes necessary even in the standby state. In the configuration of FIG. 2, the reformer Rn which is activated in the standby state is only the reformer R1, and the reformers R2 and R3 have been warmed-up but are not performing a reforming process. This can extend lives of the reformers R2 and R3. In the conventional configuration, all of the reformers R1~R3 are activated, and an operation time of the reformer Rn becomes long, which shortens the live of the reformer Rn.

By performing operation control of FIG. 4 for the power generation units U2 and U3 sequentially one by one, the reformers R1~R3 and the fuel cell stacks F1~F3 are activated sequentially one by one. Because of this, energy consumption can be suppressed significantly as compared to a case where all of the fuel cell stacks Fn are activated. An accumulated activation time of each reformer Rn and an accumulated activation time of each fuel cell stack Fn can be shortened, and the life of each reformer Rn and the life of each fuel cell stack Fn can be extended.

The operation control in which the power generation check of the fuel cell stack F1 is not performed and only a warm-up operation of the reformers R1~R3 is performed, is control in which step S104~step S107 in FIG. 4 are substantially omitted from the steps of FIG. 4. Therefore, the power generation check becomes as the warm-up operation of the reformers R1~R3. Because of this, energy consumption in the standby state can be suppressed, and efficient operation control can be performed.

Modified Example

In the operation control of FIG. 4, for example, if NO in step S112 (no electric power failure is detected), a step in which a flow rate of the raw material (e.g., hydrocarbon-based gas) supplied to the reformer R1 being activated is reduced to be smaller than that in a normal activation state may be performed. The flow rate in this step can be set according to a minimum reforming ability of the reformer R1. If this step is performed and YES in step S112 (electric power failure is detected), a step in which the flow rate of the raw material supplied to the reformer R1 being activated is increased to be returned to that in the normal activation state may be performed. Thereby, the fuel cell system 10 can properly shift from the standby state to the power generation state.

In the above configuration, the reformer R1 can be started-up from a state in which the reformer R1 performs a reforming process with a minimum level to a state in which the reformer R1 performs a reforming process with a normal level. This makes it possible to start-up the fuel cell system 10 more quickly than in a case where the reformer R1 being deactivated is started-up. Since only the reforming process with the minimum level is performed in the standby state, energy consumption can be suppressed more effectively.

Alternatively, in the state in which the fuel cell system 10 is in the standby state, the operation control may be performed in such a manner that a ratio of the reformer(s) Rn being activated to the reformer(s) Rn being deactivated among the plurality of reformers R1~Rn is changed depending on a time period although not shown. For example, if it is known in advance that an electric power consumption amount becomes peak and an electric power failure occurs frequently in the evening, the controller Ct performs operation control such that the number of reformers Rn being activated in the evening is greater than the number of reformers Rn being activated in another time period. This makes it possible to backup electric power quickly for the case of the electric power failure.

Embodiment 2

Figure 5:
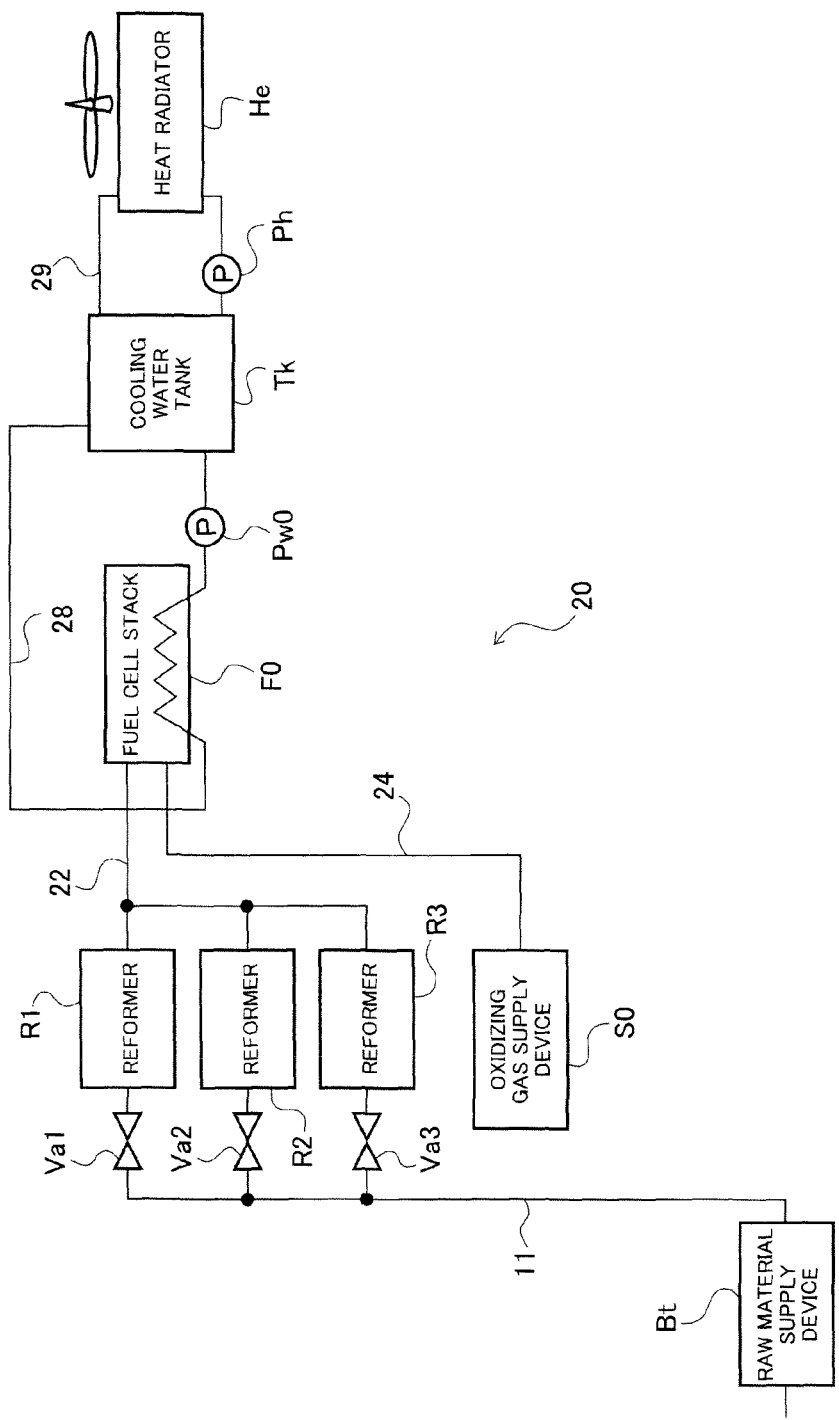
FIG. 5 is a block diagram schematically showing an exemplary configuration of a fuel cell system according to Embodiment 2 of the present invention.

As shown in FIG. 5, a fuel cell system 20 of Embodiment 2 of the present invention has the same configuration as that of the fuel cell system 10 of Embodiment 1 except that the fuel cell system 20 includes a single and large-sized fuel cell stack F0 instead of the plurality of fuel cell stacks F1~Fn in Embodiment 1. In FIG. 5, for the purpose of easier explanation, the desulfurization device D0, the heat supply devices B1~Bn, the off-gas mutual use line 13, the reformed gas reuse lines 15-1~15-n, and the combustion gas supply lines 16-1~16-n are omitted. Also, the number of reformers Rn is three (n=3) (reformers R1~R3).

In the fuel cell system 20, the reformed gas supply line 22 has a shape in which a plurality of branch passages (three passages in FIG. 5) are provided at an upstream side and the branch passages are merged into a single passage at a downstream side to supply the reformed gas generated in the reformers R~R3 to the single fuel cell stack F0. An oxidizing gas supply line 24 is entirely single line to supply the oxidizing gas (air) to the single fuel cell stack F0, unlike the oxidizing gas supply line 14.

In FIG. 5, as an example of the water flow passage, a cooling water circulating passage for cooling the fuel cell stack F0 is illustrated. The cooling water circulating passage includes a cooling water tank Tk, a heat radiator He, a cooling pump Pw0, a heat radiation pump Ph, a cooling water pipe 28 and a heat radiation water pipe 29. Specific configurations of the tank, the pump, the heat radiator, the pipe, etc., are not particularly limited, but known configurations may be used. The cooling water circulating passage may include devices, members, pipes, etc., other than these. The cooling water may be replaced by another heat medium such as an antifreeze solution in a circulating passage.

Next, an operation method of the fuel cell system 20 configured as described will be described specifically regarding a difference from that of Embodiment 1.

The raw material supply device Bt supplies the raw material to the reformers R1~R3 via the raw material supply line 11. The reformers R1~R3 reform the raw material to generate the reformed gases. The reformed gases generated in the reformers R1~R3 join in the reformed gas supply line 22 and the resulting reformed gas is supplied to the fuel cell stack F0.

The fuel cell stack F0 is provided with a cooling water circulating passage. The cooling water stored in the cooling water tank Tk is circulated through the cooling water pipe 28 by the cooling pump Pw0. Thereby, the fuel cell stack F0 is cooled. The cooling water cools the fuel cell stack F0 and recovers heat from the fuel cell stack F0. As a result, the cooling water with an increased temperature is returned to the cooling water tank Tk. The cooling water inside the cooling water tank Tk is circulated through the heat radiation water pipe 29 by a heat radiation pump Ph, and a heat radiator He cools the cooling water by heat radiation. Thereby, the fuel cell stack F0 is maintained in a predetermined temperature range.

In accordance with the present embodiment, since the single and large-sized fuel cell stack F0 is provided, an overall configuration of the fuel cell system 20 is simple. Like Embodiment 1, the off-gas derived from the reformer Rn (e.g., reformer R1) being activated can be used to warm-up another reformer Rn (e.g., reformer R2, R3) being deactivated. Therefore, energy consumption in the standby state can be suppressed. In addition, the power generation check is performed concurrently. As a result, efficient operation control is performed.

Embodiment 3

Figure 6:
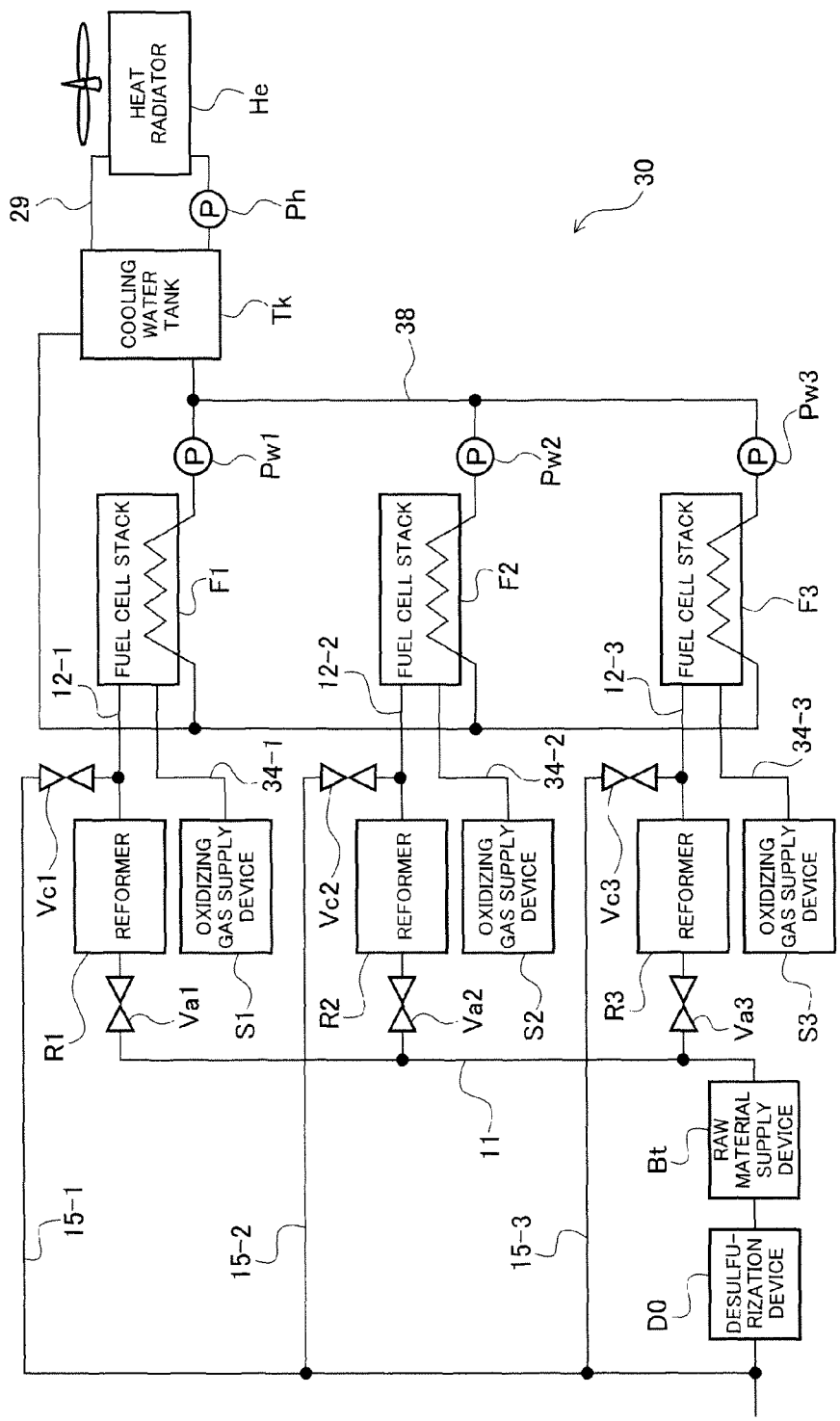
FIG. 6 is a block diagram schematically showing an exemplary configuration of a fuel cell system according to Embodiment 3 of the present invention.

As shown in FIG. 6, a fuel cell system 30 of Embodiment 3 of the present invention has the same configuration as that of the fuel cell system 10 of Embodiment 1 except that the plurality of fuel cell stacks F1~Fn include a plurality of oxidizing gas supply devices S1~Sn, respectively. In FIG. 6, for the purpose of easier explanation, the heat supply devices B1~Bn, the off-gas mutual use line 13, the reformed gas reuse lines 15-1~15-n, and the combustion gas supply lines 16-1~16-n are omitted. Also, the number of reformers Rn, the number of the fuel stacks Fn, and the number of the oxidizing gas supply devices Sn are three (n=3).

The oxidizing gas supply devices S1~S3 are connected in one-to-one correspondence to the fuel cell stacks F1~F3, respectively, via the oxidizing gas supply lines 34-1~34-3, respectively. When at least one of the fuel cell stacks F1~F3 is activated, one of the oxidizing gas supply devices S1~S3 which corresponds to the fuel cell stack Fn being activated may be activated with a proper output. This makes it possible to more accurately control the activated state of the oxidizing gas supply device Sn according to the activated state of the fuel cell stack Fn.

In the fuel cell system 30, the fuel cell stacks F1~F3 are provided with cooling water circulating passages, respectively, and a cooling water pipe 38 connected to the cooling water tank Tk branches to passages connected to the fuel cell stacks F1~F3, respectively. Cooling pumps Pw1~Pw3 are provided to correspond to the fuel cell stacks F1~F3, respectively. Therefore, depending on the activated states of the fuel cell stacks F1~F3, the corresponding cooling pumps Pw1~Pw3 are actuated properly, to change a circulating amount of the cooling water.

In accordance with the present embodiment, depending on the fuel cell stacks F1~F3 generating electric power, the activated states of the corresponding oxidizing gas supply devices S1~S3 and the activated states of the corresponding cooling pumps Pw1~Pw3 can be controlled more accurately. Therefore, energy consumption in the standby state can be suppressed more effectively. In addition, the power generation check is performed concurrently. As a result, efficient operation control is performed.

Embodiment 4

Figure 7:
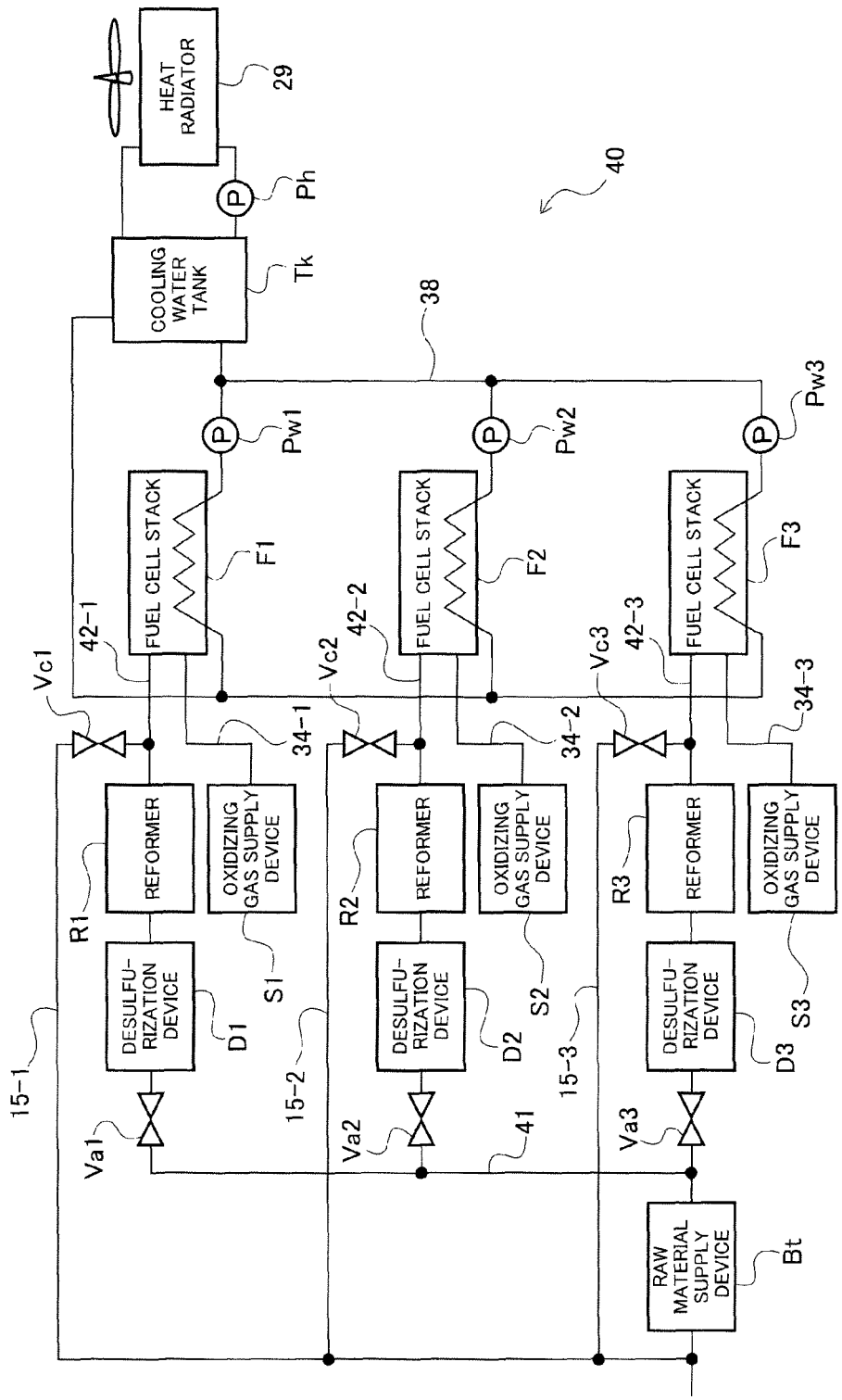
FIG. 7 is a block diagram schematically showing an exemplary configuration of a fuel cell system according to Embodiment 4 of the present invention.

As shown in FIG. 7, a fuel cell system 40 according to Embodiment 4 of the present invention has the same configuration as that of the fuel cell system 30 of Embodiment 3 except that desulfurization devices D1~D3 are provided upstream of the reformers R1~R3, respectively. In FIG. 7, for the purpose of easier explanation, the heat supply devices B1~Bn, the off-gas mutual use line 13, and the combustion gas supply lines 16-1~16-$n$ are omitted. The raw material supply line 41 has the same configuration as that of the raw material supply line 11 except that it does not include the desulfurization device D0 and the raw material supply device Bt.

Regarding an operation of the fuel cell system 40, a case where the fuel cell system 40 shifts from the standby state to the power generation state described in Embodiment 1 will be exemplarily described. In the standby state, the reformer R1 is activated and the reformers R2 and R3 are warmed-up. When the activation of the reformers R2 and R3 is started, the corresponding raw material shut-off valves Va2 and Va3 are opened. Thereby, the raw material is supplied from the raw material supply line 41 to the reformers R2 and R3 via the desulfurization devices D2 and D3, respectively. At this time point, in the reformed gas reuse line 15-1 connected to the reformer R1, the reformed gas reuse valve Vc1 is opened. Because of this, the reformed gas is supplied from the reformer R1 to regions upstream of the desulfurization devices D2 and D3 in addition to the desulfurization device D1. In the desulfurization devices D2 and D3, a hydrogenated desulfurization reaction is promoted and desulfurization is performed efficiently.

In accordance with the present embodiment, the desulfurization devices D1 D3 are provided to correspond to the reformers R1~R3, respectively. Therefore, a flow rate of a hydrocarbon based gas flowing through the desulfurization devices D1~D3 is substantially equal to a flow rate of the hydrocarbon-based gas flowing through the single desulfurization device D0 (see Embodiment 1, 3). Because of this, capacities of the desulfurization devices D1~D3 can be reduced according to the flow rate. This can reduce an amount of the reformed gas reused in the desulfurization device D0 and increase an amount of the reformed gas supplied to the heat supply device Bn.

Since the desulfurization device(s) Dn corresponding to any of the fuel cell stacks F1~F3 which is/are generating electric power perform(s) desulfurization, lives of the desulfurization devices D1~D3 can be extended. Moreover, the activated states of the fuel cell stacks F1~F3 can be controlled more accurately. Therefore, energy consumption in the standby state can be further suppressed. In addition, the power generation check is performed concurrently. As a result, more efficient operation control is performed.

Embodiment 5

Figure 8:
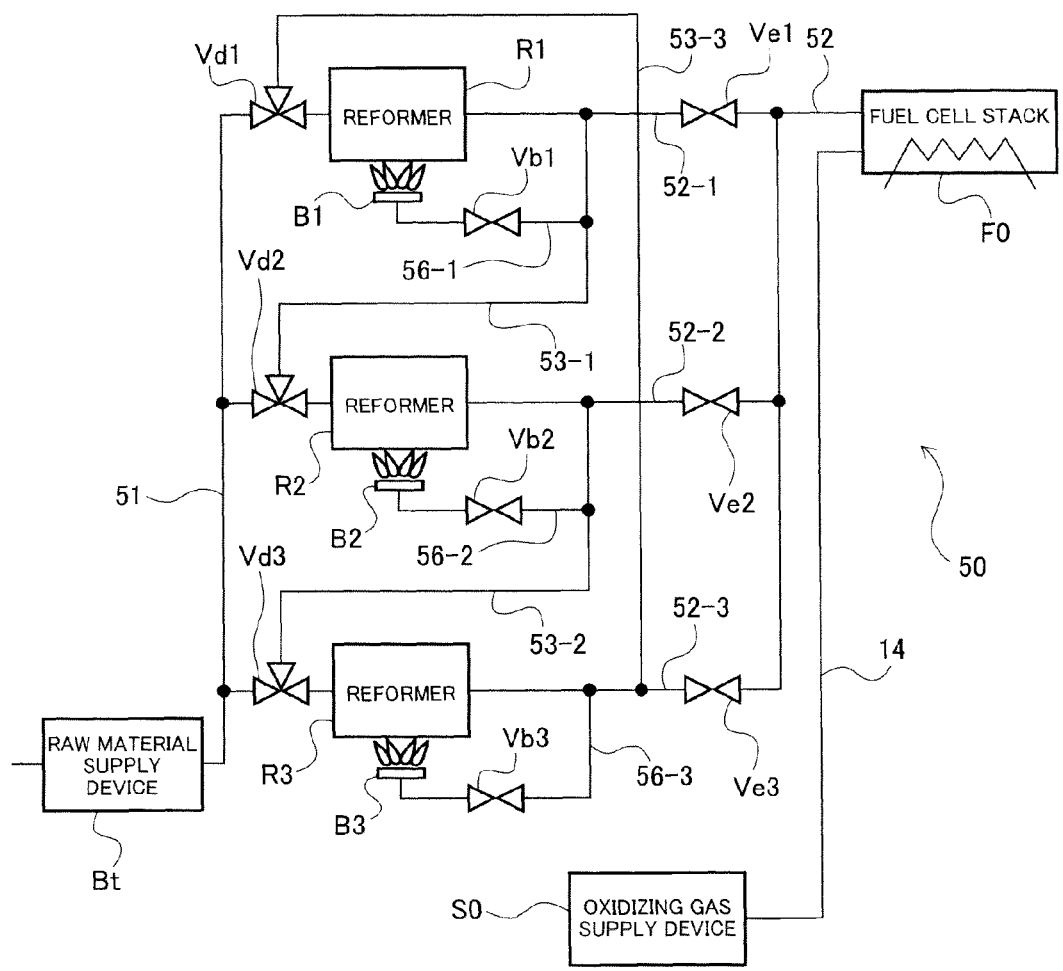
FIG. 8 is a block diagram schematically showing an exemplary configuration of a fuel cell system according to Embodiment 5 of the present invention.

As shown in FIG. 8, a fuel cell system 50 of Embodiment 5 of the present invention has the same configuration as that of the fuel cell system 20 of Embodiment 2 except that the fuel cell system 50 includes reformed gas mutual use lines 53-1~53-3 instead of the off-gas mutual use line 13. In FIG. 8, for the purpose of easier explanation, the desulfurization device D0 and the cooling water circulating passages are omitted.

Regarding a configuration of the fuel cell system 50, only a difference from the fuel cell system 20 according to Embodiment 2 will be described specifically. The raw material supply line 51 has the same configuration as that of the raw material supply line 11 except that three-way valves Vd1~Vd3 (n=3 when they are expressed as reference symbol Vdn) rather than the raw material shut-off valves Va1~Va3 at a downstream side are provided. The three-way valves Vd1~Vd3 not only supply or shutoff the raw material from the raw material supply line 51 but also supply or shutoff the reformed gas generated in another reformer Rn.

The reformers R1~R3 are connected to the fuel cell stack F0 via the reformed gas supply line 52. Like the reformed gas supply line 22, the reformed gas supply line 22 has a shape in which three branch passages are provided at an upstream side and the branch passages are merged into a single passage at a downstream side. When the passages at an upstream side are expressed as branch passage lines 52-$n$, reformed gas supply valves Ve1~Ve3 are provided at the branch passage lines 52-1~52-3, respectively.

The reformed gas mutual use line 53-$n$ is coupled to a portion of the branch passage line 52-$n$ in a location between the reformer Rn and the reformed gas supply valve Ven. A combustion gas supply line 56-$n$ has the same configuration as that of the combustion gas supply line 16-$n$ and is provided with a combustion gas valve Vbn. Note that the combustion gas in this case is a reformed gas which is not supplied to the fuel cell stack Fn yet. Specifically, the combustion gas supply line 56-1 connected to the heat supply device B1 branches from the branch passage line 52-1, the combustion gas supply line 56-2 connected to the heat supply device B2 branches from the branch passage line 53-2, and the combustion gas supply line 56-3 connected to the heat supply device B3 branches from the branch passage line 52-3.

The reformed gas mutual use line 53-$n$ is provided to connect the branch passage line 52-$n$ at a downstream side of the corresponding reformer Rn to the three-way valve Vdn located upstream of another reformer Rn. Specifically, the reformed gas mutual use line 53-1 connects the branch passage line 52-1 at a downstream side of the reformer R1 to the three-way valve Vd2 located upstream of the reformer R2. The reformed gas mutual use line 53-2 connects the branch passage line 52-2 at a downstream side of the reformer R2 to the three-way valve Vd3 located upstream of the reformer R3. The reformed gas mutual use line 53-3 connects the branch passage line 52-3 at a downstream side of the reformer R3 to the three-way valve Vd1 located upstream of the reformer R1.

Next, an operation method of the fuel cell system 50 configured as described will be described specifically regarding only a difference from that of Embodiment 1 or Embodiment 2.

In an initial state, the three-way valves Vd1~Vd3 provide communication between the corresponding reformers Rn and the corresponding reformed gas mutual use lines, respectively. Then, in step S101~step S104 in FIG. 4, the controller Ct switches the three-way valve Vd1 to allow the reformer R1 constituting the power generation unit U1 to communicate with the raw material supply device Bt, and opens the reformed gas supply valve Ve1 and the combustion gas valve Vb1. Thereby, the raw material is supplied from the raw material supply line 51 to the reformer R1 via the three-way valve Vd1. The reformer R1 reforms the raw material into the reformed gas.

A portion of the reformed gas generated in the reformer R1 is supplied to the combustion gas supply line 56-1 and used to heat the reformer R1 by the heat supply device B1. The remaining portion of the reformed gas is supplied to the fuel cell stack F1 constituting the power generation unit U1. In the power generation units U2 and U3, the reformed gas supply valves Ve2 and Ve3 and the combustion gas valves Vb2 and Vb3 are closed. Therefore, a portion of the reformed gas generated in the reformer R1 is not supplied to the power generation units U2 and U3.

Then, in step S108~step S111 in FIG. 4, the combustion gas valve Vb2 is opened, and a portion of the reformed gas generated in the reformer R1 is supplied to the reformer R2 via the reformed gas mutual use line 53-1 and the three-way valve Vd2. The reformed gas supplied to the reformer R2 has already been reformed in the reformer R1 as described above, and thus flows out of the reformer R2 without substantially changing its composition. This reformed gas is supplied to the combustion gas supply line 56-2 and used to warm up the reformer R2 by the heat supply device B2. Then, the combustion gas valve Vb3 is opened, and a portion of this reformed gas is supplied to the reformer R3 via the reformed gas mutual use line 53-2 and the three-way valve Vd3. Then, the reformed gas is supplied from the reformer R3 to the combustion gas supply line 56-3 and used to warm up the reformer R3 by the heat supply device B3.

If an electric power failure is detected, in step S113~step S115 in FIG. 4, the controller Ct switches the three-way valve Vd2 to allow the reformer R2 to communicate with the raw material supply device Bt and opens the reformed gas supply valve Ve2 and the combustion gas valve Vb2. Thereby, the raw material is supplied from the raw material supply line 51 to the reformer R2 via the three-way valve Vd2. The reformer R2 reforms the raw material into the reformed gas. Thereby, a portion of the reformed gas is supplied to the combustion gas supply line 56-2 and used to heat the reformer R2 by the heat supply device B2. The remaining portion of the reformed gas is supplied to the fuel cell stack F2 and used in the power generation therein.

Then, the controller Ct switches the three-way valve Vd3 to allow the reformer R3 to communicate with the raw material supply device Bt and opens the reformed gas supply valve Ve3 and the combustion gas valve Vb3. Thereby, the raw material is supplied from the raw material supply line 51 to the reformer R3 via the three-way valve Vd3. The reformer R3 reforms the raw material into the reformed gas. Thereby, a portion of the reformed gas is supplied to the combustion gas supply line 56-3 and used to heat the reformer R3 by the heat supply device B3. The remaining portion of the reformed gas is supplied to the fuel cell stack F3 and used in the power generation therein. In this state, all of the three-way valves Vd1~Vd3 shut off the corresponding reformed gas mutual use lines 53-n and the corresponding reformers Rn, and therefore the reformed gas generated in a particular reformer is not supplied to the heat supply device corresponding to another reformer.

As described above, in the fuel cell system 50, as the combustion gas of the heat supply device Bn, a portion of the reformed gas generated in the reformer Rn and supplied to the fuel cell stack Fn is used instead of the off-gas discharged from the fuel cell stack Fn. Since the reformed gas contains hydrogen as a major component, it is possible to extend the life of the reformer Rn as compared to a case where the raw material (typically, hydrocarbon based gas) remains inside of the reformer Rn in the standby state.

That is, when the reformer Rn is not activated in the standby state, the raw material remains inside of the reformer Rn in the standby state. If the raw material contains a component (for the purpose of easier explanation, referred to as hydrocarbon based component) having a carbon framework such as hydrocarbon, the hydrocarbon based component is thermally decomposed to generate carbon particles (soot) with a temperature increase due to the warm-up. If a great amount of soot is generated, this soot covers a surface of a reforming catalyst inside the reformer Rn, which impedes proceeding of the reforming reaction. To solve this, the reformed gas is used as the fuel gas of the heat supply device Bn while flowing the reformed gas through the reformer Rn, generation of the soot is avoided. As a result, the reforming catalyst can be used for a long period of time.

In accordance with the present embodiment, energy consumption in the standby state can be suppressed more effectively and the life of the reformer Rn can be extended. Further, by performing the power generation check concurrently, more efficient operation control can be performed.

In the fuel cell system 50, as the fuel for the heat supply devices B1~B3, a portion of the reformed gas supplied to the fuel cell stack Fn is used. Like the fuel cell system 10 of Embodiment 1, the off-gas mutual use line 13 is provided so that a portion of the off-gas can be utilized as the fuel for the heat supply devices B1~B3. In this case, the off-gas mutual use line 13 is provided with an off-gas use valve, and the three-way valve Vdn and the off-gas use valve are suitably opened and closed. Thereby, as the fuel for the heat supply devices B1~B3, the reformed gas generated in the reformer Rn or the off-gas discharged from the fuel stack Fn can be used. For example, in the standby state, the reformed gas can be used, while in the power generation state, the off-gas can be used.

Embodiment 6

Figure 9:
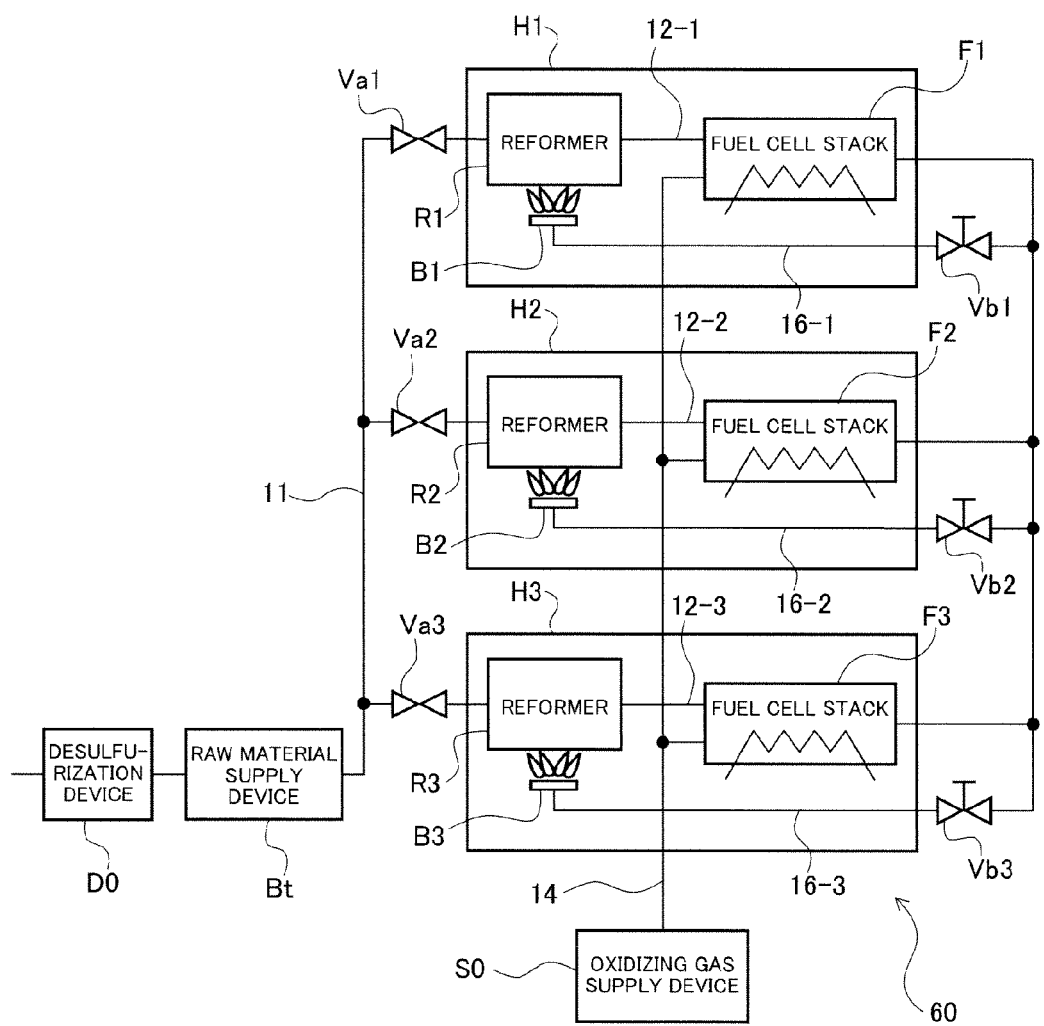
FIG. 9 is a block diagram schematically showing an exemplary configuration of a fuel cell system according to Embodiment 6 of the present invention.

As shown in FIG. 9, a fuel cell system 60 of Embodiment 6 of the present invention has the same configuration as that of the fuel cell system 10 of Embodiment 1 except that the fuel cell stack Fn and the reformer Rn are enclosed by a heat insulating member Hn, in the fuel cell system 60.

Specifically, as shown in FIG. 9, the fuel cell system 60 according to the present embodiment includes the desulfurization device D0, the raw material supply device Bt, the oxidizing gas supply device S0, the plurality of reformers R1~Rn, the plurality of fuel cell stacks F1~F3, the plurality of heat supply devices B1~B3, lines coupling them to each other, and valves provided in these lines.

The fuel cell stack F1 is, for example, a solid oxide fuel cell (SOFC) like Embodiment 1, and is enclosed together with the reformer R1 by the heat insulating member H1. The heat supply device B1 is provided inside of the heat insulating member H1. The heat supply device B1 supplies heat to the fuel cell stack F1 and the reformer R1. The fuel cell stacks F2 and F3 have the same configuration.

The desulfurization device D0 and the raw material supply device Bt are connected to the raw material supply line 11. The desulfurized raw material is supplied to the reformers R1~R3 via the raw material supply line 11 and the raw material shut-off valves Va1~Va3, respectively. The reformed gas is supplied from each reformer Rn to the corresponding fuel cell stack Fn via the corresponding reformed gas supply line 12-n. The fuel cell stack Fn is supplied with the oxidizing gas such as air from the oxidizing gas supply device S0 via the oxidizing gas supply line 14. The fuel cell stack Fn performs power generation using the reformed gas and the oxidizing gas.

The fuel cell stack Fn is enclosed together with the reformer Rn and the heat supply device Bn by the heat insulating member Hn. In the fuel cell stack F1, hydrogen in the reformed gas is consumed with an amount corresponding to power generation, so that off-gas is discharged from the fuel cell stack F1. The off-gas which has not been consumed in the power generation is supplied from the fuel cell stack Fn to the heat supply device Bn via the combustion gas supply line 16-n and the combustion gas valve Vbn. The combustion gas valve Vbn is provided outside of the heat insulating member Hn. Note that the fuel cell system 60 is not provided with the reformed gas reuse lines 15-1~15-n.

In the fuel cell system 60 configured as described above, the fuel shut-off valves Va1~Va3 and the combustion gas valves Vb1~Vb3 are actuated to supply the raw material and the off-gas to only the reformer Rn which is to be activated, among the reformers R1~R3. For example, in the case of activating the reformer R1, only the fuel shut-off valve Va1 is opened to supply the raw material only to the reformer R1 and at the same time, the combustion gas valve Vb1 is opened to supply to the heat supply device B1 the off-gas having passed through and discharged from the fuel cell stack F1. The heat supply device B1 combusts the off-gas to maintain the temperature of the reformer B1. Since the reformer B1 and the fuel cell stack F1 are covered with the heat insulating member H1, the heat supply device B1 can warm-up the reformer B1 and the fuel cell stack F1. In a case where the reformer R2 or R3 is warmed-up, the combustion gas valve Vb2 or Vb3 is opened to supply the off-gas to the heat supply device R2 or R3, respectively.

In accordance with this configuration, like the fuel cell system 10 of Embodiment 1, the combustion gas valves Vb2 and Vb3 as well as the combustion gas valve Vb1 are opened, so that for example, the three reformers R1~R3 are warmed-up and the fuel cell system 60 is in the standby state against an electric power failure. When the fuel cell system 60 includes four or more power generation units (see FIG. 2), four or more reformers R1~Rn can be warmed-up.

If an electric power failure occurs and a need for power generation in the fuel cell stacks F1~F3 arises, the fuel shutoff valves Va2 and Va3 are opened to supply the fuel to the reformers R2 and R3. Since the reformers R2 and R3 have been warmed-up to a temperature at which the fuel can be reformed, they can generate the reformed gas as soon as the fuel is supplied thereto. The fuel cell stacks F2 and F3 can generate electric power upon the reformed gas being supplied thereto.

The SOFC used in the fuel cell stack Fn is expanded or contracted according to a change in a temperature. For this reason, if a temperature change occurs frequently, this may cause degradation such as damages to cells constituting a stack. By comparison, in the present embodiment, the warm-up operation is performed all the time, and the fuel cell stack Fn is enclosed together with the reformer Rn and the heat supply device Bn by the heat insulating member H1. This makes it possible to carry out the operation while minimizing a temperature change.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention can suitably be used in fields of backup power supplies for communication equipment, hospitals, broadcast stations, etc., and can be widely used in fields to which a fuel cell system is applicable.

REFERENCE SINGS LISTS

Bn, B1~B3 heat supply device
Ct controller
Ck power generation inspector
D0, Dn, D1~D3 desulfurization device
F0, Fn, F1~F3 fuel cell stack
Rn, R1~R3 reformer
Un, U1~U3 power generation unit
10, 20, 30, 40, 50, 60 fuel cell system
12-n, 12-1~12-3 reformed gas supply line
13 off-gas mutual use line (reformed gas mutual use line)
15-n, 15-1~15-3 reformed gas reuse line
22 reformed gas supply line
42-n, 42-1~42-3 reformed gas supply line
52 reformed gas supply line
81 communication base station (electric power consumption equipment)
84 utility power net (power supply system)

The invention claimed is:

1. A fuel cell system comprising:
a plurality of reformers for reforming a raw material to generate a reformed gas containing hydrogen;
a plurality of fuel cell stacks for generating electric power using the reformed gas supplied from the reformers, the plurality of fuel cell stacks corresponding to the plurality of reformers, respectively;
heat supply devices provided as corresponding to the reformers, respectively, each of the heat supply devices being configured to combust the reformed gas to supply heat to corresponding one of the reformers;
a reformed gas mutual use line through which the reformed gas generated in each of the reformers is supplied to the heat supply device corresponding to each of the reformers and the heat supply device corresponding to another one of the reformers; and
reformed gas supply lines, each connecting each of the plurality of reformers to corresponding one of the plurality of fuel cell stacks, in one-to-one correspondence.

2. The fuel cell system according to claim 1, wherein the reformed gas mutual use line is an off-gas mutual use line through which a portion of an off-gas is supplied to the heat supply device corresponding to another one of the reformers, the off-gas being the reformed gas supplied from each of the plurality of reformers to corresponding one of the plurality of fuel cell stacks and discharged from the corresponding one of the plurality of fuel cell stacks.

3. The fuel cell system according to claim 1, further comprising:
a desulfurization device which removes a sulfur component from the raw material through a hydrogenated desulfurization reaction and supplies to the plurality of reformers, the raw material from which the sulfur component has been removed; and a reformed gas reuse line which returns a portion of the reformed gas generated in the plurality of reformers to the desulfurization device.

4. The fuel cell system according to claim 3, wherein the desulfurization device includes a plurality of desulfurization devices corresponding to the plurality of reformers, respectively.

5. The fuel cell system according to claim 1, further comprising:

a combustion gas supply line through which the reformed gas generated in each of the reformers is supplied to the heat supply device corresponding to the each of the plurality of reformers.

6. The fuel cell system according to claim 5, wherein the reformed gas mutual use line is configured to supply a portion of the reformed gas generated in each of the plurality of reformers and supplied to at least one of the plurality of fuel cell stacks to the heat supply device corresponding to another one of the plurality of reformers, via the another one of the plurality of reformers and the combustion gas supply line.

7. The fuel cell system according to claim 1, further comprising:

a controller;
wherein the controller performs control in such a manner that:
when at least one of the plurality of reformers is activated with remaining reformers being deactivated, and at least one of the remaining reformers being deactivated should start to be activated,
the reformed gas generated in the at least one reformer being activated is supplied through the reformed gas mutual use line, to one of the heat supply devices corresponding to the at least one of the remaining reformers which should start to be activated to warm-up the at least one of the remaining reformers which should start to be activated by using the heat supply device, and then the at least one of the remaining reformers which should start to be activated is activated and the at least one of the plurality of reformers being activated is deactivated.

8. The fuel cell system according to claim 7, further comprising:

a power generation inspector for inspecting a power generation state of at least one of the plurality of fuel cell stacks;
wherein the controller performs control in such a manner that the at least one of the plurality of fuel cell stacks supplied with the reformed gas from the at least one reformer being activated starts power generation, the power generation inspector inspects a power generation state of the power generation performed in the at least one of the plurality of fuel cell stacks, and the power generation in the at least one of the plurality of fuel cell stacks is stopped after the inspection.

9. The fuel cell system according to claim 8, wherein the controller performs control in such a manner that after inspection for the power generation state of one of the plurality of fuel cell stacks is completed and power generation in the one of the plurality of fuel cell stacks is stopped, power generation in another fuel cell stack is started, and the power generation inspector inspects a power generation state of the power generation performed in the another fuel cell stack.

10. The fuel cell system according to claim 1, further comprising:

a controller;
wherein the controller performs control in such a manner that, when a first reformer of the plurality of reformers is activated with remaining reformers being deactivated, and a second reformer of the remaining reformers being deactivated should start to be activated, the reformed gas generated in the first reformer is supplied through the reformed gas mutual use line, to one of the heat supply devices, which corresponds to the second reformer, to warm-up the second reformer by using the heat supply device, and then the second reformer is activated and the first reformer is deactivated.

11. A method of operating a fuel cell system including reformers for reforming a raw material to generate a reformed gas containing hydrogen; at least one fuel cell stack for generating electric power using the reformed gas supplied from the reformers; and heat supply devices provided as corresponding to the reformers, respectively, each of the heat supply devices being configured to combust the reformed gas to supply heat to corresponding one of the reformers; and a reformed gas mutual use line through which the reformed gas generated in each of the reformers is supplied to the heat supply device corresponding to each of the reformers and the heat supply device corresponding to another one of the reformers; the method comprising:

in a state in which the fuel cell system is in a standby state against emergencies, activating at least one of the reformers and deactivating remaining reformers; and
when at least one of the reformers being deactivated starts to be activated, deactivating the at least one of the reformers being activated.

12. The method of operating the fuel cell system according to claim 11, further comprising:

in a state in which the fuel cell system is in a standby state against emergencies, supplying the reformed gas generated in the at least one of the reformers being activated to the heat supply device corresponding to the at least one of the reformers being deactivated via the reformed gas mutual use line to warm-up the at least one of the reformers being deactivated by using the heat supply device.

13. The method of operating the fuel cell system according to claim 12, further comprising:

in a state in which the fuel cell system is in a standby state against emergencies,
causing the at least one fuel cell stack supplied with the reformed gas from the at least one of the reformers being activated to start power generation;
inspecting a power generation state of the power generation performed in the at least one fuel cell stack; and
causing the at least one fuel cell stack to stop the power generation after the inspection.

14. The method of operating the fuel cell system according to claim 13, wherein:

the fuel cell system includes a plurality of fuel cell stacks, and
the method further comprises:
in a state in which the fuel cell system is in a standby state against emergencies,
inspecting a power generation state of one of the fuel cell stacks and stopping power generation in the one of the fuel cell stacks after the inspection is completed;
causing another fuel cell stack to start power generation; and
inspecting a power generation state of the power generation performed in the another fuel cell stack.

15. The method of operating the fuel cell system according to claim 14, wherein:
the fuel cell system includes a plurality of power generation units each of which is configured such that one reformer supplies the reformed gas to one fuel cell stack, and
the method further comprises:
in a state in which the fuel cell system is in a standby state against emergencies, inspecting power generation states of the power generation units sequentially one by one.

16. The method of operating the fuel cell system according to claim 11, further comprising:
in a state in which the fuel cell system is in a standby state against emergencies, detecting whether or not electric power supply from a power supply system to electric power consumption equipment supplied with electric power from the fuel cell system and the power supply system is stopped;
maintaining the standby state in the fuel cell system in a state in which a flow rate of the raw material supplied to the at least one reformer being activated is reduced to be smaller than a flow rate of the raw material in a normally activated state of the at least one reformer, when stop of the electric power supply is not detected; and
increasing the flow rate of the raw material supplied to the at least one reformer being activated to the flow rate of the raw material in the normally activated state of the at least one reformer, and starting activation of the at least one reformer being deactivated to shift the fuel cell system from the standby state to a power generation state, when the stop of the electric power supply is detected.

17. The method of operating the fuel cell system according to claim 11, further comprising:
in a state in which the fuel cell system is in a standby state against emergencies, changing a ratio of the reformer being activated to the reformer being deactivated, among the reformers, depending on a time period.

\* \* \* \* \*